Figure 15:
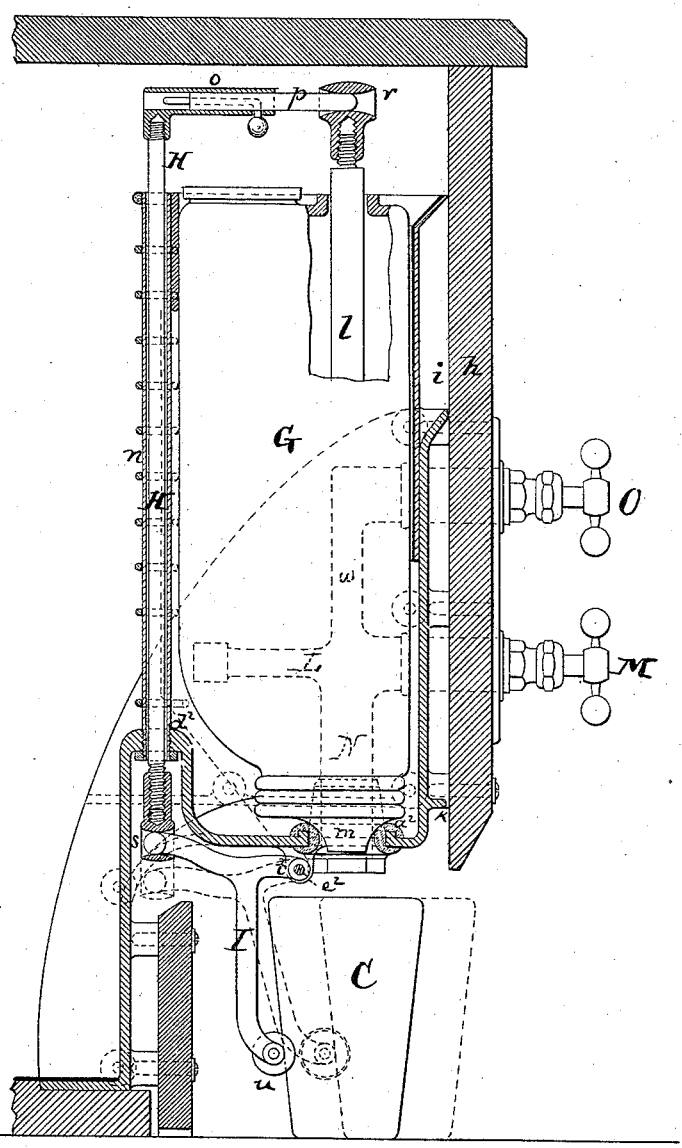

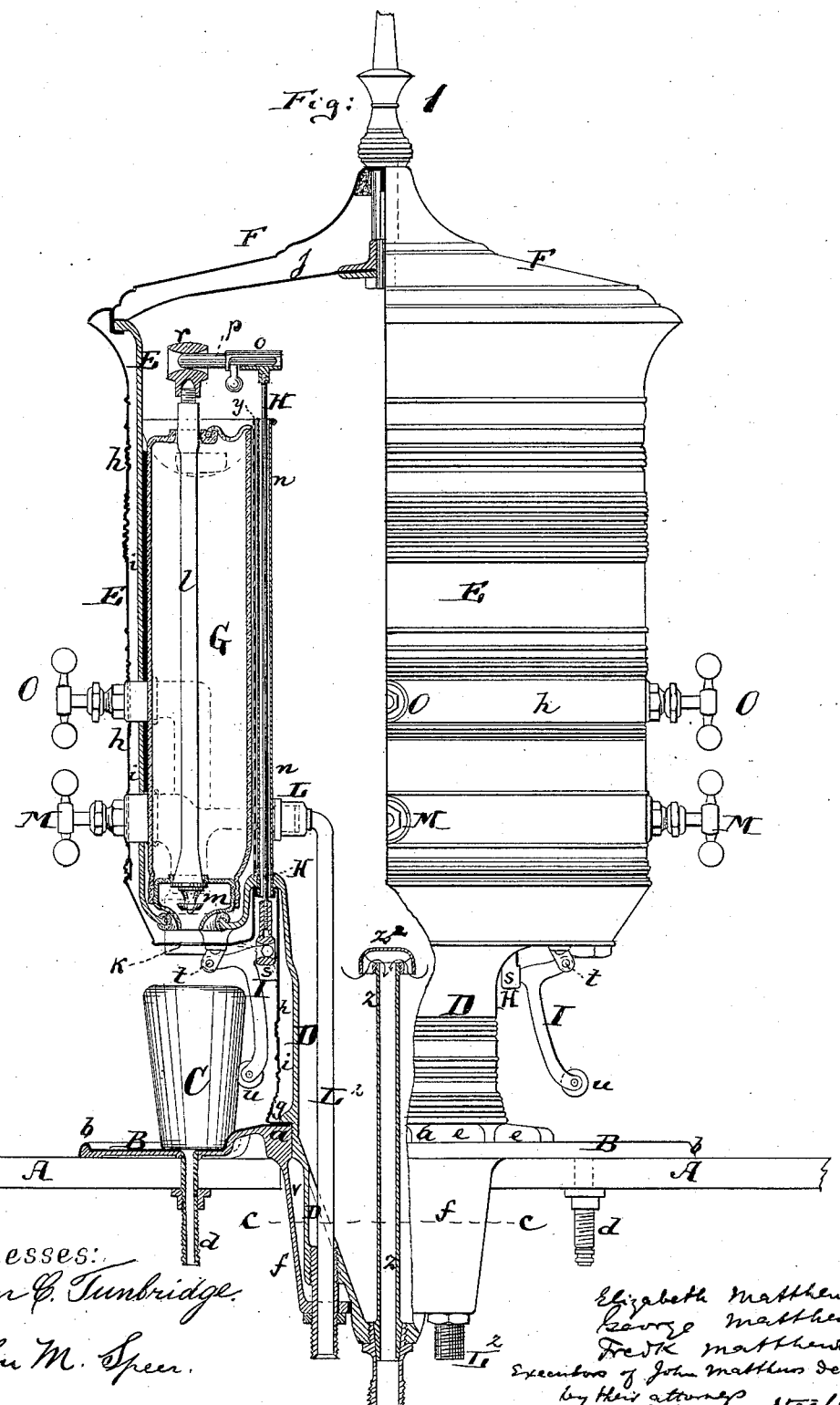

(No Model.) 7 Sheets—Sheet 2.
J. MATTHEWS, Dec'd.
E., G. & F. MATTHEWS, Executors.
APPARATUS FOR DISPENSING AERATED BEVERAGES.
No. 307,562. Patented Nov. 4, 1884.
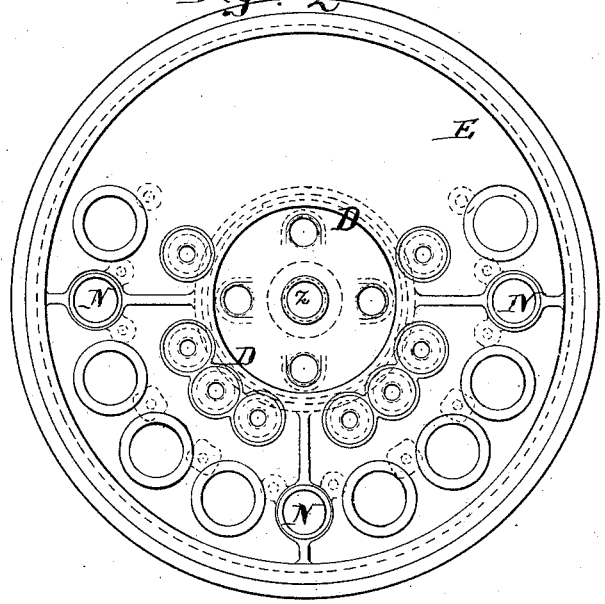
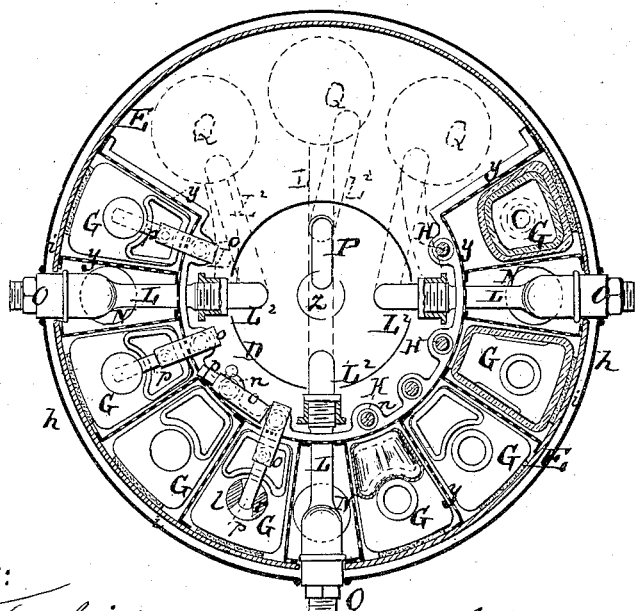

(No Model.) 7 Sheets—Sheet 3.
J. MATTHEWS, Dec'd.
E., G. & F. MATTHEWS, Executors.
APPARATUS FOR DISPENSING AERATED BEVERAGES.
No. 307,562. Patented Nov. 4, 1884.
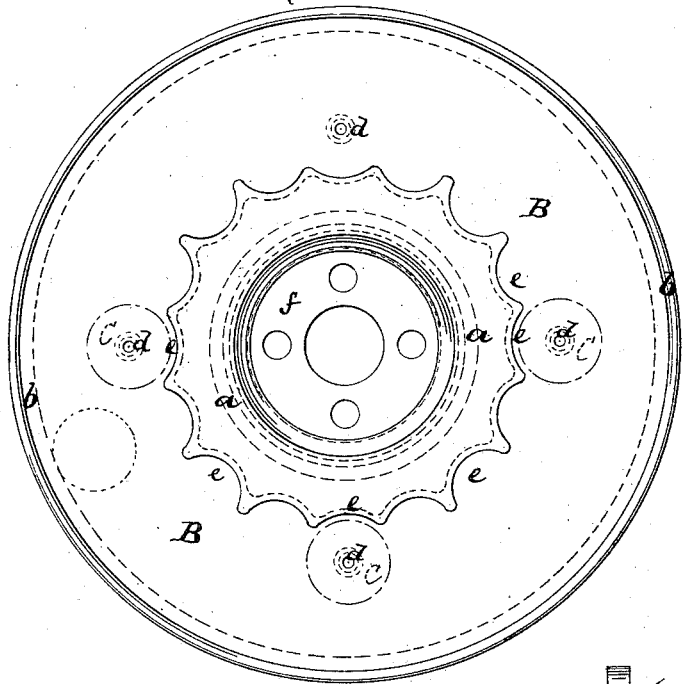
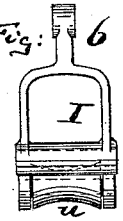
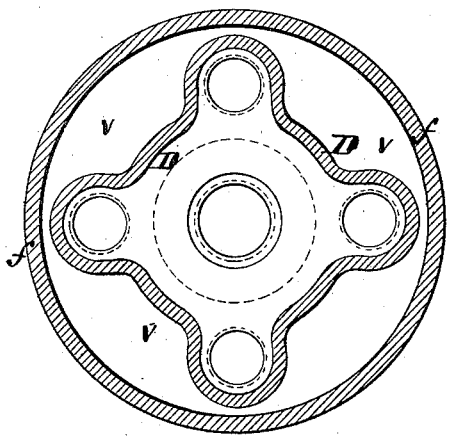
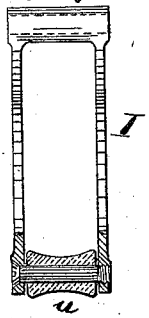

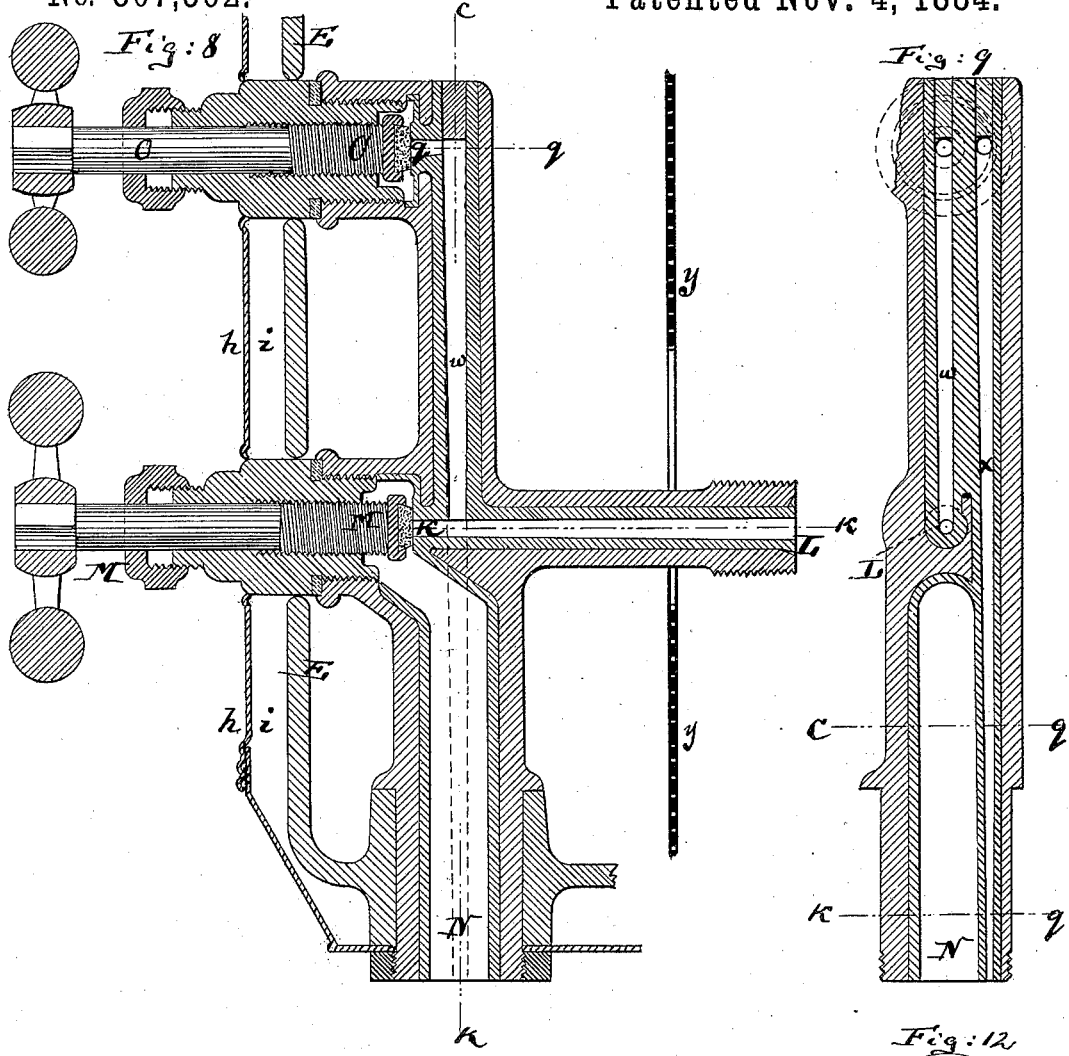

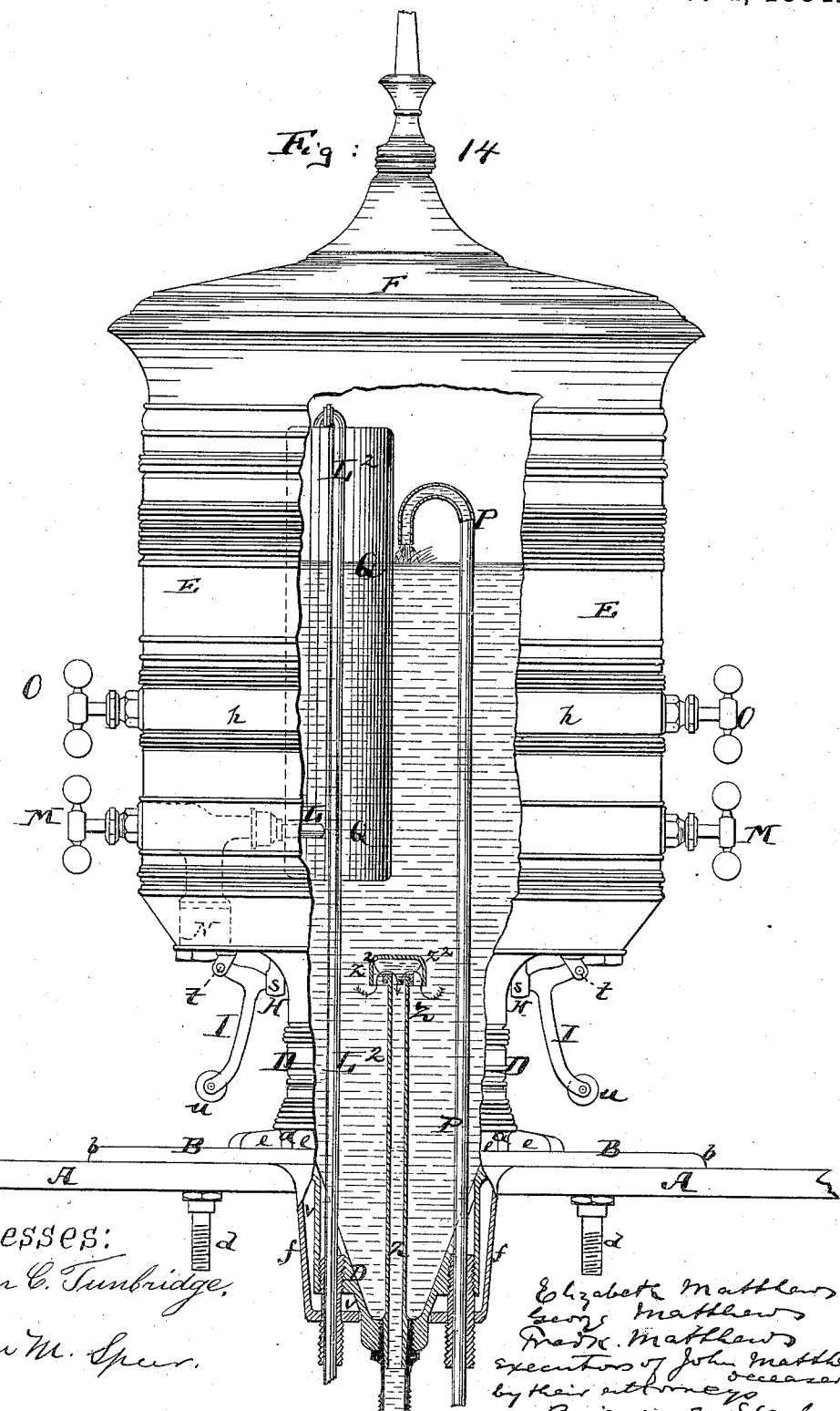

(No Model.)

J. MATTHEWS, Dec'd.
E., G. & F. MATTHEWS, Executors.
APPARATUS FOR DISPENSING AERATED BEVERAGES.

No. 307,562. Patented Nov. 4, 1884.

Witnesses:
John C. Tunbridge
John M. Spurr

Elizabeth Matthews
George Matthews
Frank Matthews
executors of John Matthews deceased
by their attorneys
Briesen & Steele (No Model.) 7 Sheets—Sheet 7.
J. MATTHEWS, Dec'd.
E., G. & F. MATTHEWS, Executors.
APPARATUS FOR DISPENSING AERATED BEVERAGES.
No. 307,562. Patented Nov. 4, 1884.
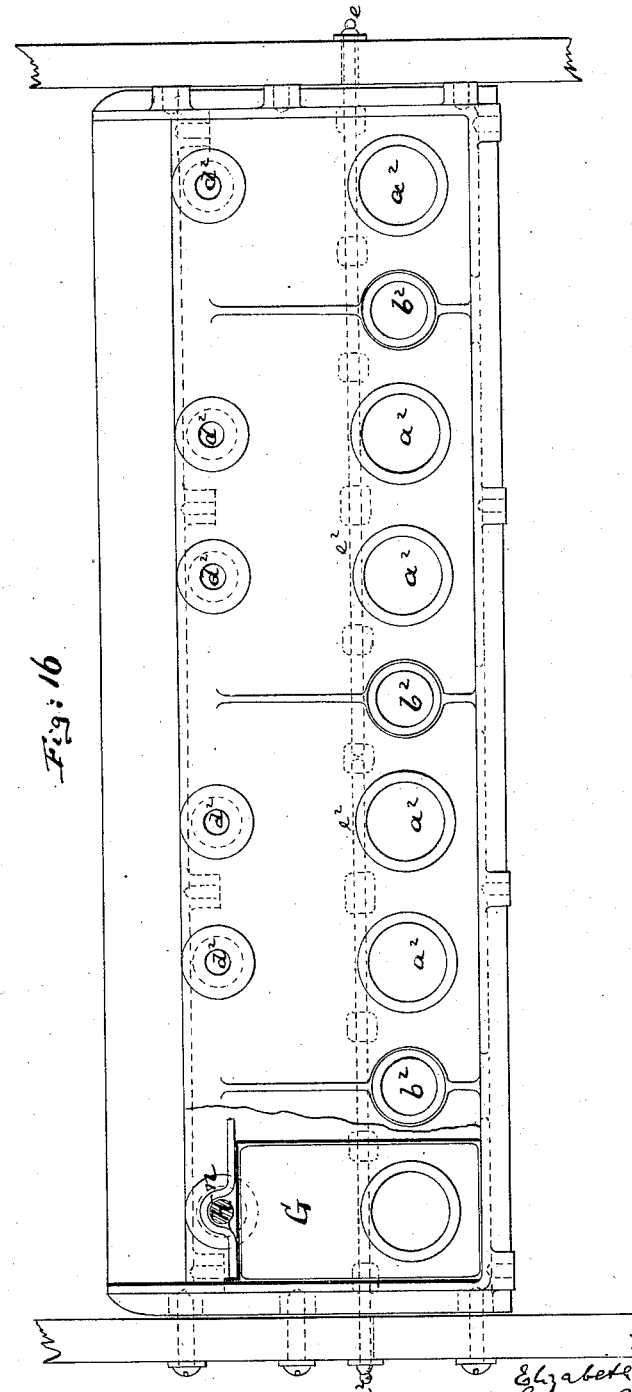
Witnesses
John C. Tunbridge,
John M. Spur
Elizabeth Matthews
George Matthews
Fred'k Matthews
Executors of John Matthews, deceased
by their attorneys
Briesen & Steele

UNITED STATES PATENT OFFICE.

ELIZABETH MATTHEWS, GEORGE MATTHEWS, AND FREDERICK MATTHEWS, OF NEW YORK, N. Y., EXECUTORS OF JOHN MATTHEWS, DECEASED.

APPARATUS FOR DISPENSING AERATED BEVERAGES.

SPECIFICATION forming part of Letters Patent No. 307,562, dated November 4, 1884.

Application filed July 2, 1883. (No model.)

*To all whom it may concern:*

Be it known that JOHN MATTHEWS, late of New York, county and State of New York, who departed this life on the 13th day of March, 1883, had invented, prior to his death, and perfected an Improved Apparatus for Dispensing Aerated Beverages, of which the following is a full, clear, and exact description, reference being had to the accompanying drawings, in which—

Figure 1 is a side elevation, partly in section, of the said improved dispensing apparatus. Fig. 2 is a plan or top view of the apparatus with the cover and the sirup-vessels removed, so as to show the appearance of the bottom of the apparatus. Fig. 3 is a horizontal section of the apparatus, taken in part above the plane of the sirup-vessels and in part below the top of the said sirup-vessels. Fig. 4 is a plan or top view of the base-plate of the apparatus. Fig. 5 is a horizontal section on the plane of the line $c\ c$, Fig. 1. Fig. 6 is a detail plan view of the lever for operating the sirup-valves. Fig. 7 is a detail side view, partly in section, of said lever. Fig. 8 is an enlarged vertical section of the cock for discharging the aerated beverage. Fig. 9 is a vertical section on the plane of the line $c\ k$, Fig. 8. Fig. 10 is a horizontal section on the plane of the line $k\ k$, Fig. 8. Fig. 11 is a horizontal section on the plane of the line $q\ q$, Fig. 8. Fig. 12 is a horizontal section on the plane of the line $c\ q$, Fig. 9. Fig. 13 is a horizontal section on the plane of the line $k\ q$, Fig. 9. Fig. 14 is a back view, partly in section, of the apparatus. Fig. 15 is a vertical cross-section of a modified form of said apparatus. Fig. 16 is a plan view of said modified apparatus with the sirup-vessels and internal mechanism removed, the lid also having been removed.

Similar letters of reference indicate corresponding parts.

This invention relates to certain improvements in apparatus for dispensing soda-water, mineral waters, and other aerated beverages, together with or separate from the sirups that are often mixed with such beverages.

The invention consists in a peculiar mechanism for lifting the sirup-valves, in a peculiar construction of sirup-receptacle, in a peculiar construction of the body of the apparatus, and in other details of improvements that are hereinafter more fully specified.

With more particular reference to Fig. 1 of the drawings, wherein the apparatus is shown partly in elevation and partly in section, the general outline of the invention can be understood. In this figure the letter A represents the table or platform on which the apparatus is supported. B is the base-plate of the apparatus, which rests on the table A, and which has a raised central portion, $a$, and a raised peripheral flange, $b$, so that the depression between these raised portions will be an annular channel for receiving the drippings of soda-water from the tumblers C, that are placed upon this depressed portion of the bed-plate. The bed-plate B is fastened to the table or platform A by downwardly-projecting tubes $d$, as shown at the left-hand side of Fig. 1, said tubes being threaded below the table A to receive nuts for clamping the bed-plate securely to the table. The said tubes at the same time serve as discharge-outlets for the drippings that may reach the grooved or channeled portion of the bed-plate. The raised part $a$ of the bed-plate has an undulating outer edge, as is more plainly shown in the top view of said bed-plate, Fig. 4, each undulation or recess $e$ being intended to fit one of the tumblers C, so that by placing the tumbler against the recessed part of said raised portion $a$ it will by that means be brought in line vertically with the liquid-outlet with which it is to communicate. The undulations referred to are marked $e$ in Fig. 4. They are also shown on the right-hand side of Fig. 1. The central part of the bed-plate B forms a hopper-shaped downwardly-extending vessel, $f$, which reaches through a central opening of the table A, as shown in Fig. 1, and serves to receive in its lower portion the several pipes, hereinafter described, that convey liquid into and discharge useless liquid from the apparatus. On the central portion of the bed-plate B is supported the tubular stem D of the dispensing apparatus, which stem rests by a shoulder, $g$, on the raised portion $a$ of the bed-plate B, as is more clearly indicated in Fig. 1 at the left-hand side, and extends thence downward into the vessel f, passing finally with its lower contracted end through a central aperture in the bottom of the extension f of the bed-plate B. The upper part of the tubular stem D is enlarged and joined to the annular bottom of the main vessel E, which it supports. The stem D and vessel E may be made of one piece. The main vessel, as well as the tubular stem D, may be made of metal or any other suitable material, and is by preference made with hollow walls, so as to retain an air-space, i, within an outer shell, h, of sheet metal—such as silvered sheet metal. This air-space i has for its effect to keep the contents of the apparatus cool. It will be seen from the sectional part of Fig. 1 that the vessel E is so constructed as to overhang and extend beyond the stem D and over the recessed part of the bed-plate B, so as to be above the tumblers C that may stand on said bed-plate. F is the cover of the main vessel E, which is also made of double sheet metal, as shown, so as to have an air-space, j. Air in the air-space i is not absolutely confined, but can circulate so as to remain fresh and pure in said space through the openings k, that are formed in the shell h below the sirup-valves, and that constitute also outlets for the sirup. Other apertures may also be formed, if desired, in or by the shell h. In the vessel E are supported within the overhanging part thereof a series of sirup-vessels, G, that are emplaced, when the apparatus is of the circular form shown in Figs. 1, 2, 3, 4, in circular order, as indicated in Fig 3. In each of these sirup-vessels is a valve-stem, l, which carries at its lower portion the valve m, and which can be raised by a pusher-rod, H, that works vertically in suitable guide-tubing, n, which is contained within the apparatus. Each pusher-rod has at its upper part a horizontal socket, o, in which a bolt, p, can play horizontally, said bolt extending, when the apparatus is operative, into an eye, r, that is at the top of the valve-stem l, as is more clearly shown in Fig. 1. Whenever the sirup-vessel is to be removed to be cleaned, or for other purposes, the bolt p is pushed into the socket o, so as to clear the eye r, and then rod H can be turned to move the parts o p aside, and the sirup-vessel can be taken out with its appurtenances. The lower end of the pusher-rod H, below the overhanging part of the vessel E proper, is screwed into or provided with a socket, s, which has an eye at its lower portion, into which eye enters an inwardly-projecting arm of a lever, I. This lever is pivoted at t to a lug projecting downward from the body E, as shown in Fig. 1, and carries at its lower end a frictional roller, u. Whenever the tumbler C is to be charged with sirup, it is pressed against the roller u of the lever I, in manner shown in Fig. 1 at the left-hand side of said figure, and thereby causes said lever to swing on its pivot, elevate the pusher-rod H, and thereby lift the valve m from the lowermost outlet-orifice of the sirup-vessel, allowing a proper quantity of the sirup to flow into the tumbler. As soon as the tumbler C is taken out of its recess e, in which it thus pressed against the lever I, the weight of the valve m, valve-rod l, and pusher-rod H will cause the valve to drop down again and close the lower discharge-orifice, and will swing the lower end of the lever I out again into the position indicated on the right-hand side of Fig. 1. It is not necessary to employ the frictional roller u on the lever I; but it is very advantageous to do so, and by preference that roller should be placed in a fork of the lever, and made of rubber.

Fig. 6 represents a top view of the lever I, and Fig. 7 a face view, partly in section, of the same, these figures indicating clearly the preferred form of the said lever. It will be seen from an examination of the lower part of Fig. 1 and the horizontal section thereof, Fig. 5, which latter figure is drawn on an enlarged scale, that an air-space, v, is also formed between the lower extension, f, of the bed-plate B and the lower part of the tubular socket D, which air-space adds to the efficiency of the apparatus in keeping its temperature as near as possible at the proper point. Between certain of the sirup-vessels G are the tubes for discharging the aerated beverage or mineral-water and the like. In simple apparatus but one such discharge arrangement may be employed; but for general uses it is preferred to have a series of the discharge-faucets for the beverages, three being shown in Fig. 3. Of these three one or more can be used for soda-water and the other or others for mineral-water and the like. The construction of such a faucet for the discharge of soda-water is more clearly shown in Figs. 8, 9, 10, 11, 12, and 13, and will be described with more particular reference to those figures—that is to say, the pipe L, which leads from the interior of the apparatus E toward the discharge-faucet, can be bodily closed at its outer end by a valve, M, which, when opened, allows the liquid to flow in a large stream through the large outlet-tube N. A branch tube, w, projects from the pipe L, as in Fig. 8, and has its end closed by a valve, O. When this valve O is opened, the liquid passes from the pipe w into another pipe, x, (see Fig. 11 and arrow therein,) which pipe x extends downward to near the outlet end of the pipe N, and which tapers down so as to form a very fine outlet. By opening the valve M alone, a full stream of liquid may be obtained, and by opening the valve O alone, and leaving M closed, a very minute stream of the aerated beverage is obtained, which is to be used for the purpose of thoroughly disturbing the sirup in the tumbler and stirring it up, causing it to have its particles separated, thereby mixing it with the full stream of soda-water that is afterward let into the tumbler. If desired, both valves M and O can be opened at the same time, when it is intended to agitate by the fine stream the liquid that enters the tumbler through the large pipe N. The space within the circles or row of sirup-vessels in the apparatus E is partitioned off by a perforated partition, $y$, (see Fig. 3,) which perforated partition may, if desired, also have radial branches that lead to the outer wall of the apparatus between the sirup-vessels, as shown. This perforated partition serves to hold the guide-tubes $n$ for the pusher-rod H, and to sustain the pipes L for the discharge of soda-water, and also to maintain the sirup-vessels in place, and, being perforated, nevertheless admits free circulation of any cooling-liquid that may be within the apparatus E to take place between the sirup-vessels, and, in fact, throughout the entire interior of the apparatus that is not occupied by inner vessels or pipes. The pipes for conveying the aerated beverage to the pipes L are shown in Fig. 1 at $L^2$, and pass, by preference, up through the bottom of the extension $f$ into the lower part of the tubular stem D, and thence into the interior of the apparatus, they being coupled to the pipes L by well-known means for coupling pipes together. In ordinary cases ice is packed into the apparatus within the space formed by the perforated partition $y$. The water that is produced by the melting of this ice will be allowed to flow off through a stand-pipe, $z$, that extends through the bottom of the apparatus to a height about on a level with the outlet-openings of the sirup-vessels, so as thereby to insure that the lower part of the apparatus be always filled with cold water, which will serve to cool the space in which pipes $L^2$ pass up. In winter it is not necessary to fill the apparatus with ice, as ordinary water is then sufficiently cool to reduce the temperature of the beverages that are discharged through the apparatus. In that case a pipe, P, which is shown in Fig. 14, is employed to convey cold water into the interior of the apparatus, the stand-pipe $z$ taking the surplus off. In case of the use of this pipe P, it may be at times desirable to reverse its function with that of the pipe $z$—that is to say, let the cold water enter through the pipe $z$ and let the spent water escape through the pipe P. When coolers are required, they can be used in the apparatus, one such cooler, Q, being shown in Fig. 14, Fig. 3 indicating three dotted circles that show where several coolers can be placed. These coolers will, when used, receive the soda-water through the pipe or pipes $L^2$ and discharge it into the pipe or pipes L.

In Figs. 15 and 16 is indicated substantially the same arrangement of apparatus when the sirup-vessels are arranged in a straight line. It will be clearly perceived from Fig. 15 that, so far as the cross-section of the apparatus in the straight form is concerned, it will compare in many particulars with the apparatus shown in cross-section in Fig. 1, excepting that instead of the sheet-metal inclosure at $h$ in the straight apparatus, as usual, a marble or other stone casing is employed, which casing takes the place of the shell $h$, and which bears against ribs that project outward from the body E of the apparatus, forming the air-space already referred to.

In Fig. 16 one of the sirup-tanks E is shown; but at the other parts the outlet-openings in the apparatus for the discharge of the sirup are indicated at $a^2$, while at $b^2$ are shown the openings through which the aerated beverages are passed, and $d^2$ the openings through which the pusher-rods H extend, yet the apparatus is entirely straight, as in Fig. 16. All the several levers I can be hung on a single rod, $e^2$, which, when pulled out lengthwise, will allow all the levers to be taken out; or, by preference, that rod may be made in two parts, as indicated by dotted lines in Fig. 16, for greater convenience in handling each series of levers at either end of the apparatus.

The pipes and cocks of the apparatus, whenever they are exposed to contact with acidulated waters, are lined with block-tin or other protecting substance. This is clearly indicated in Figs. 8 to 13, inclusive. The upper end of the stand-pipe $z$ has a cap, $z^2$, which, dipping into the ice-water, prevents warm air from entering the apparatus through the pipe $z$.

What is claimed is—

1. The bed-plate B, combined with the tubes $d$, that extend downward through the table to which said plate is fastened, and with nuts on said tubes below said table, substantially as and for the purposes described.

2. The bed-plate B, made with central raised portion, $a$, having undulations $e$, substantially as herein shown and described.

3. The bed-plate B, made with rib $b$, central raised portion, $a$, undulations $e$, and downwardly-extending central part, $f$, substantially as herein shown and described.

4. The combination of the bed-plate B with the overhanging main vessel E, which is provided with the tubular stem D, having flange $g$, substantially as herein shown and described.

5. The combination of the valve-rod $l$, having eye $r$, with the pusher-rod H, having socket $o$, and the sliding bolt $p$, substantially as and for the purpose described.

6. The combination of the pusher-rod H, for raising the sirup-valve in soda-water-dispensing apparatus, with the lever I, connected therewith, said lever being placed in the path of the tumbler to be filled, substantially as specified.

7. The combination of the pusher-rod for the sirup-valve with the lever I and frictional roller $u$, substantially as and for the purpose specified.

8. The combination of the bed-plate B, having downward extension $f$, with the overhanging main vessel E, which is provided with and supported on the tubular socket D, passing into said extension, and the cover F and shell $h$, all arranged to form air-spaces $i$, $j$, and $v$, substantially as described.

9. The combination of the main body of dispensing apparatus E, having sirup-vessels G and beverage-discharge pipes L, with the perforated partition $y$ within said apparatus, substantially as described.

10. The soda-water-dispensing apparatus having sirup-vessels and outlets for aerated beverages, in combination with the pipes $z$ and P and cap $z^2$, all arranged so that the apparatus can be cooled by the use of flowing water, substantially as described.

11. In apparatus for dispensing soda-water, the combination of the main vessel E of the apparatus, which is provided with the tubular stem D, and the outlet-pipe $z$ and cap $z^2$, which is contained in said tubular stem and extends to the level, about, of the outlets from the sirup-vessels, substantially as specified.

ELIZABETH MATTHEWS.
GEORGE MATTHEWS.
FREDERICK MATTHEWS.

Witnesses:
GEO. HEALY,
H. P. RAFTEN.